United States Patent [19]

Hobson et al.

[11] 4,210,348
[45] Jul. 1, 1980

[54] DUST-SEALING ASSEMBLY FOR A COUPLING

[75] Inventors: Willis S. Hobson, Columbus; Elmer A. Graber, Seymour, both of Ind.

[73] Assignee: Seymour Manufacturing Co., Inc., Seymour, Ind.

[21] Appl. No.: 890,067

[22] Filed: Mar. 27, 1978

[51] Int. Cl.² ............... F16L 37/22; F16L 37/28
[52] U.S. Cl. .......................... 285/1; 285/45; 285/137 R; 285/316
[58] Field of Search ............ 285/45, 277, 316, 1, 285/137 R; 137/614.06

[56] References Cited

U.S. PATENT DOCUMENTS

| | | | |
|---|---|---|---|
| 2,014,355 | 9/1935 | Hussman | 285/45 |
| 2,930,633 | 3/1960 | Ethington et al. | 285/277 X |
| 3,551,013 | 12/1970 | Trojanowski et al. | 285/316 X |
| 4,005,735 | 2/1977 | Miyamoto | 285/45 X |
| 4,074,698 | 2/1978 | Hobson et al. | 285/1 X |

FOREIGN PATENT DOCUMENTS 1218952 12/1959 France ................ 285/45

Primary Examiner—Thomas F. Callaghan
Attorney, Agent, or Firm—Cohn, Powell & Hind

[57] ABSTRACT

A dust-sealing assembly for a coupling for use in a fluid circuit in which a body member is movably mounted on a mounting plate, and a nipple-releasing mechanism is fixed to the mounting plate and embraces a sleeve member that is mounted on and extends from one end of the body member, the nipple-releasing mechanism being spaced from the one end of the body member. A compression spring is disposed about the sleeve member in the space between the body member and nipple-releasing mechanism for holding the body member relatively away from the nipple-releasing mechanism. A dust cover is disposed about the sleeve member and spring, and is disposed in the space between the body member and the nipple-releasing mechanism for deterring entry of foreign material into the space. The compression spring engages the dust cover and retains the dust cover in place. The dust cover includes a flange that extends over the space and into close lapping relation to the nipple-releasing mechanism for permitting relative movement and yet deterring entry of foreign material therebetween. The elongate slot extends into the space below the dust cover, and a dust-sealing layer is extended over the elongate slot for deterring entry of foreign material into the space through the slot.

5 Claims, 9 Drawing Figures

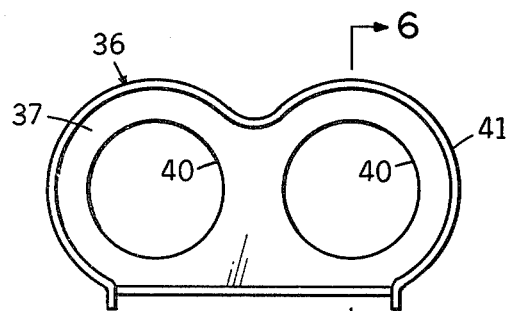
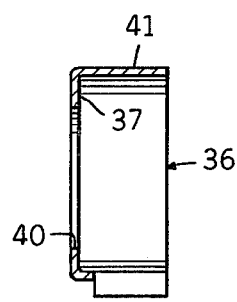
FIG. 5    FIG. 6
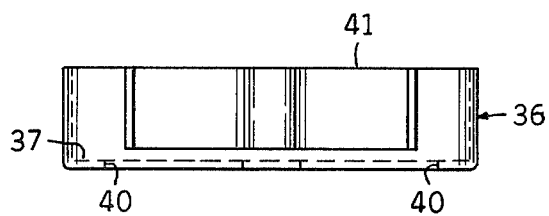
FIG. 7
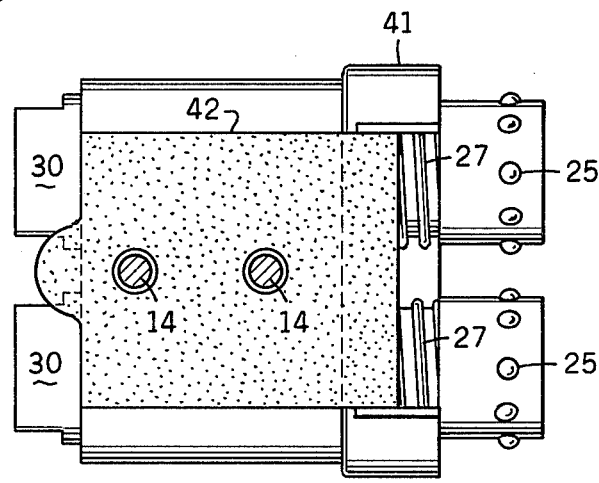
FIG. 8
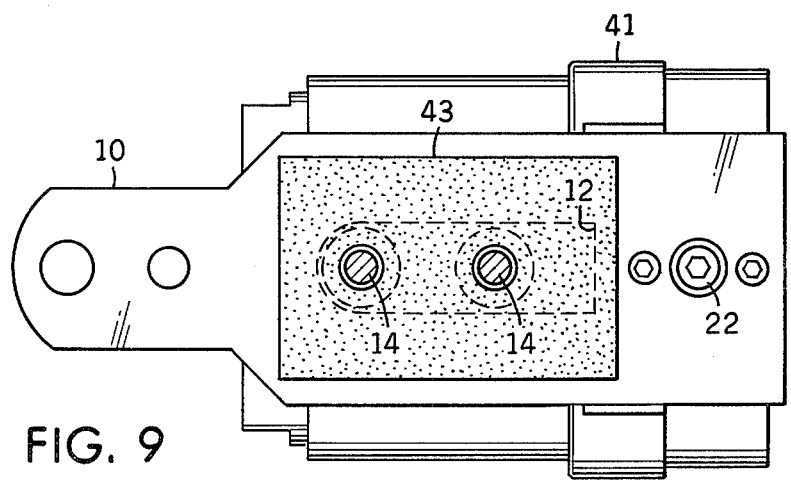
FIG. 9

DUST-SEALING ASSEMBLY FOR A COUPLING

BACKGROUND OF THE INVENTION

This invention relates generally to improvements in a coupler for use in a fluid circuit, and more particularly to a dust-sealing assembly that precludes blockage between relatively movable parts that would adversely affect operation of the coupling. The present dust-sealing assembly is adapted for particular use with a hydraulic coupler that is disclosed and claimed in U.S. Pat. No. 4,074,698 issued Feb. 21, 1978, the disclosure of which is incorporated by reference. In this hydraulic coupler, a compression spring is located around each of the sleeve members, and is disposed in the space between the coupler body member and the nipple-releasing means. The compression spring tends to hold the body member away from the nipple-releasing means that is fixed to the mounting plate. Because the space between the body member and nipple-releasing means is open and the spring is exposed, foreign material such as dirt, mud, gravel, vegetation and the like, can enter this space and possibly cause blockage of the spring and of the relative movement between the body member and nipple-releasing means against spring loading, and thereby adversely affect coupler operation.

SUMMARY OF THE INVENTION

The present dust-sealing assembly precludes foreign material from entering the space between the body member and nipple-releasing means, and thereby deters such material from causing any blockage of the compression spring and from causing any obstacle to relative movement between the body member and nipple-releasing means, which would otherwise adversely affect coupler operation.

The coupling includes a body member movably mounted on a mounting plate, and a sleeve member mounted on and extending from one end of the body member. A nipple-releasing means is fixed to the mounting plate and embraces the sleeve member, the nipple-releasing means being spaced from the one end of the body member. Disposed about the sleeve member in the space between the body member and nipple-releasing means, is a compression spring for holding the body member relatively away from the nipple-releasing means. The dust-sealing assembly includes a dust cover disposed about the sleeve member and spring, and disposed in the space between the body member and nipple-releasing means for deterring entry of foreign material into the space.

In the dust-sealing assembly, the compression spring engages the dust cover and retains the dust cover in place. More particularly, the dust cover includes a wall adjacent the body member, and the spring engages and urges the dust cover wall against the body member for retaining the dust cover in place.

In addition, the dust cover includes an integral flange extending from the wall adjacent the body member, and extending over the space and into lapping relation to the nipple-releasing means. The dust cover flange is in close adjacency to the nipple-releasing means for permitting relative movement and yet deterring entry of foreign material therebetween.

The mounting plate of the coupling includes an elongate slot that extends into the space below the dust cover, and the body member includes guide means slidably mounted in the elongate slot. A dust-sealing layer is placed over the elongate slot to preclude entry of foreign material through the slot and into the space between the body member and nipple-releasing means.

More particularly, the dust-sealing layer is disposed between the body member and the mounting plate and extends across the space between the body member, dust cover, and nipple-releasing means. Further, the dust-sealing layer can be disposed on the side of the mounting plate opposite to the body member. It is also advantageous to place a dust-sealing layer in both locations.

BRIEF DESCRIPTION OF THE DRAWINGS

FIG. 5 is a front view of the dust cover;
FIG. 6 is a cross section of the dust cover taken on line 6—6 of FIG. 5;
FIG. 7 is a bottom plan view of the dust cover;
FIG. 8 is a cross sectional view taken on line 8—8 of FIG. 2,
and
FIG. 9 is a cross sectional view taken on line 9—9 of FIG. 2.

DESCRIPTION OF THE PREFERRED EMBODIMENT

Figure 1:
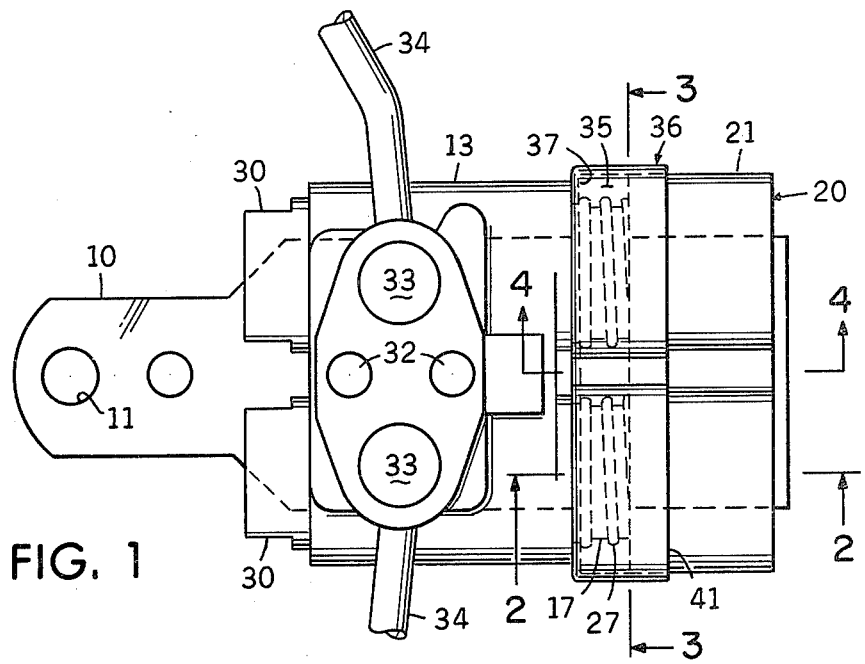
FIG. 1 is a top plan view of the coupling.
Figure 2:
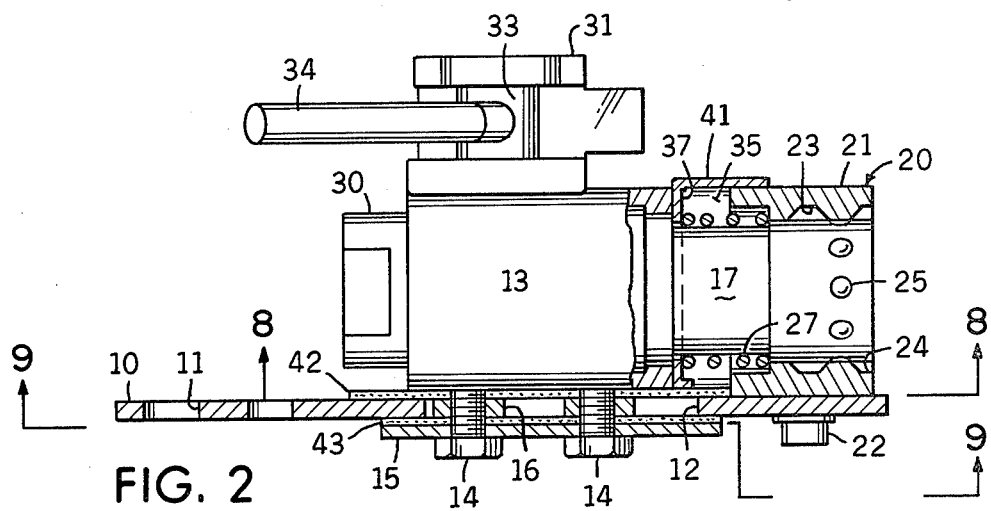
FIG. 2 is a side elevational view, partially in cross section taken on line 2—2 of FIG. 1.

It will be understood that the coupling with the exception of the dust-sealing assembly is fully disclosed in U.S. Pat. No. 4,074,698 issued Feb. 21, 1978. The component parts including the valve mechanisms and cooperating nipples, and their structural relationships, and the operation of the coupling is fully described. Accordingly, the disclosure of this prior U.S. Pat. No. 4,074,698 is incorporated by reference in the present specification.

Because the internal valve mechanisms of the coupling do not constitute an essential part of the present invention, such is not described particularly herein, but reference can be made to this prior U.S. Pat. No. 4,074,698.

Referring now by characters of reference to the drawings, the automatic coupling device includes a mounting plate 10 that is fixed to the tractor frame by a suitable fastener (not shown) inserted through a plate hole 11. Formed in the mounting plate 10 is an elongate slot 12.

A body member 13 is movably mounted on the mounting plate 10. A pair of longitudinally spaced threaded bolts 14 extend through a bottom plate 15 and through guide bearings 16, and are threadedly attached to the underside of body member 13. The guide bearings 16 are slidably located in the mounting plate slot 12. The bottom plate 15 has sufficient clearance with the mounting plate 10 so that the guide bearings 16 can slide longitudinally in the slot 12.

Figure 3:
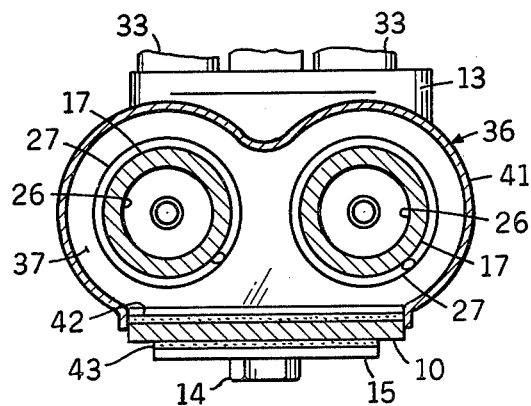
FIG. 3 is a cross sectional view taken on line 3—3 of FIG. 1.
Figure 4:
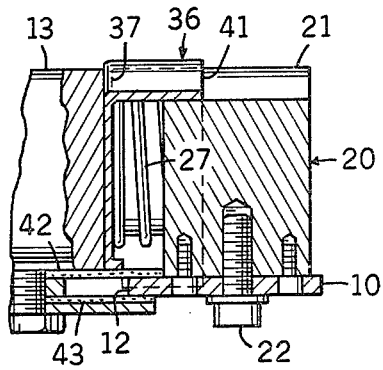
FIG. 4 is a fragmentary, cross sectional view taken on line 4—4 of FIG. 4.

The present assembly provides a pair of couplers as is illustrated in FIGS. 1 and 3, and as described in the prior U.S. Pat. No. 4,074,698. Structure and function of these couplers are described in detail in this prior patent and such description is incorporated by reference.

The essential structure of the present invention will be described in detail relative to one of these couplers, and such detailed description will suffice for the other.

Slidably mounted in the body member 13, is a sleeve member 17, the sleeve member 17 extending from one end of the body member 13.

A nipple-releasing means generally indicated by 20 includes a collar 21 constituting a locking element, fixed to the mounting plate 10 by a threaded cap screw 22. As is illustrated in FIG. 1, the collar 21 is a unitary transverse piece that serves the same function for the other coupler. The collar 21 is provided with a pair of internal, longitudinally spaced grooves 23 and 24.

In addition, the nipple-releasing means includes a plurality of locking balls 25, constituting locking elements, carried in compatible holes formed in the sleeve member 17 near its outer end. As is usual, the locking balls 25 can extend partially into the bore 26 of the sleeve member 17.

One end of the collar 21 is recessed to receive a compression spring 27, constituting a resilient means, that is disposed about the sleeve member 17. One end of the spring 27 engages both the sleeve member 17 and the collar 21, while the other end of the spring 27 effectively bears against the end of the body member 13. The spring 27 has a multiple function. First, the sleeve member 17 can be moved or retracted from its extended position relative to the body member 13 under spring loading. Secondly, the body member 13 and sleeve member 17 can be moved as a unit longitudinally relative to the mounting plate 10 against the loading of the spring 27 as permitted by the sliding movement of guide bearings 16 in the plate slot 12, the spring 27 tending to hold the body member 13 relatively away from the nipple-releasing means 20.

Slidably mounted in both the body member 13 and the sleeve member bore 26, is a valve body means 30. The outer inlet end of the valve body means 30 can be connected by a conduit (not shown) to a source of fluid under pressure. This fluid would then be fed through the hydraulic coupler to a remote hydraulic cylinder or other equipment (not shown). The detailed structure of this valve body means 30, its mounting in the body member 13 and to the sleeve member 17, and its function are fully described in the previously identified U.S. Pat. No. 4,074,698.

An actuating cam means includes a cam-retaining plate 31 fixed to the body member 13 by a pair of screws 32. As is shown in FIG. 1, the cam-retaining plate 31 extends transversely of the body member 13 for use with both couplers. Rotatively mounted in the cam-retaining plate 31 and the body member 13 is a cam cylinder 33. A handle 34 is attached to the cam cylinder 33, and is adapted to rotate the cylinder 33. Attached to the lower end of the cam cylinder 33 and eccentrically offset from the rotative axis of the cylinder 33 is a cam (not shown) that is operatively connected to the valve body means 30, as is disclosed in U.S. Pat. No. 4,074,698.

When the cam cylinder 33 is rotated by the handle 34, the valve body means 30 can be moved to a position closely adjacent the sleeve member 17 so as to preclude effective relative movement of the body member 13 and sleeve member 17, and effectively precludes movement of the sleeve member 17 away from its extended position in which the locking balls 25 are urged inwardly by the cooperating locking collar 21 and effectively lock the releasable means. The cam cylinder 33 can be rotated by the handle 34 so as to move the valve body means 30 to another position in which the valve body means 30 is spaced from the sleeve member 17, and thereby allows relative movement of the body member 13 and sleeve member 17 and allows movement of the sleeve member 17 away from its extended position so that the locking balls 25 can be urged radially into the compatible grooves 23 in the locking collar 21, whereby to effectively unlatch the releasable means.

The valve means (not shown) in the valve body means 32, and the coupler nipple (not shown) and its cooperation with the sleeve member 17 and the nipple-releasing means 20, and the valve means carried internally of the nipple, are fully disclosed in U.S. Pat. No. 4,074,698. It will be understood that the coupler nipple (not shown) can be effectively inserted into the sleeve member 17 and locked in place by the nipple-releasing means 20. The compression spring 27 tends to urge the sleeve member 17 to its extended position in which the locking balls 25 are urged into the sleeve member bore 26 into a locking condition of the nipple-releasing means 20. If the handle 34 is turned so as to move the valve body means 30 to its position closely adjacent the sleeve member 17, the sleeve member 17 cannot be moved away from its extended position so as to cause an unlocking of the releasable means. As a result, when the nose of the nipple (not shown) is inserted into the releasable means and the sleeve member 17, the nipple will engage the locking balls 25 and be prevented from moving fully into the sleeve member 17 for connection with the releasable means. As will be understood in U.S. Pat. No. 4,074,698, the valve elements (not shown) in the sleeve member 17 and nipple cannot be opened under fluid pressure.

As will be understood from U.S. Pat. No. 4,074,698, to effectively and operatively connect the nipple (not shown), the cam cylinder 33 is turned by the handle 34 so as to move the valve body means 30 to its extended position in longitudinally spaced relation from the sleeve member 17. Then the nose of the nipple is inserted into the end of the sleeve member 17 and engages the locking balls 25. Because the locking balls 25 cannot move radially outward, the nipple will move the sleeve member 17 longitudinally away from its extended position against the loading of the compression spring 27. When the locking balls 25 move into radial alignment with the collar groove 23, the locking balls 25 will move radially outward into such groove 23, thereby permitting full insertion of the nipple. The compression spring 27 then moves the sleeve member 17 back to its extended position, together with the fully inserted nipple, and the locking collar 21 maintains the locking balls 25 inwardly, and the nipple is effectively and operatively locked by the releasable means to the sleeve member 17.

Again, as explained and will be understood in U.S. Pat. No. 4,074,698, the valve elements carried by the sleeve member 17 and the nipple are not opened, and the connection of the nipple is accomplished quickly and easily without being subject to fluid line pressure. Also, achievement of fluid line pressure and fluid flow after the nipple is attached, is fully described in this prior patent.

While the feature of automatic decoupling is described in prior U.S. Pat. No. 4,074,698, it will be briefly mentioned herein to emphasize the functioning of compression spring 27 and the need for relative movement between the body member 13 and nipple-releasing means 20. When a pull is exerted on a hose (not shown) connected to a nipple attached to the nipple-releasing means 20, such as would be done if an implement being pulled by the tractor were accidentally or unintentionally disconnected, an outward pull is exerted through the locking balls 25, which moves the sleeve member 17 and the body member 13 as a unit relative to the mounting plate 10 against the loading of the compression spring 27, the guide bearing 16 slidably moving in the plate slot 12. If sufficient force has been exerted to overcome the spring loading such that the sleeve member 17 will move forward to a position to align the locking balls 25 with the collar groove 24, the locking balls 25 will move radially outward and the nipple-releasing means 20 will then unlock the nipple. As will be understood from U.S. Pat. No. 4,074,698, when the nipple is unlocked by the nipple-releasing means 20 and withdrawn from the sleeve member 17 and the nipple-releasing means 20, fluid pressure is shut-off and fluid flow is stopped in both coupling parts.

Under these circumstances, as soon as the nipple (not shown) is released, the compression spring 27 will move the sleeve member 17 and the body member 13 as a unit back to its original position relative to the mounting plate 10 and nipple-releasing means 20, the guide bearings 16 move in the plate slot 12. When the sleeve member 17 is back in its original position, the locking balls 25 are again moved radially inward and the releasable means is locked. Coupling parts are then conditioned for subsequent use in the manner previously described.

The space 35 between the end of the body member 13 and the collar 21 of nipple-releasing means 20 must be closed in order to prevent the entry of foreign material such as dirt, mud, rocks, vegetation and the like, which might block the coils of compression spring 27 and otherwise deter relative movement between the body member 13 and collar 21 as is required for full effective operation of the coupling.

A dust cover indicated by 36 is disposed about the sleeve member 17 and spring 27, and is disposed in the space 35 between the body member 13 and collar 21 of nipple-releasing means 20. The dust cover 36 includes a substantially vertical wall 37 that is disposed against the end of the body member 13, the cover wall 37 being provided with apertures 40 through which the sleeve member 17 extend. An integral flange 41 extends from the wall 37 into overlapping relation to the collar 21 of nipple-releasing means 20, the flange 41 being in close adjacency to the collar 21 to permit relative movement therebetween and yet deter the entry of foreign material therebetween.

The compression spring 27 engages the cover wall 37 and holds the dust cover 36 securely in place. The dust cover 36 will move with the body member 13 when the body member 13 is moved relatively to the mounting plate 10. During such movement of the dust cover 36, the flange 41 extending across the space 35 maintains effective closure of the space 35 along the top and sides to the mounting plate 10.

Under some circumstances, the plate slot 12 will extend slightly into the space 35 below the dust cover 36. To preclude entry of foreign material into the space 35 through the slot 12, a dust-sealing layer 42 is disposed over the slot 12 between the body member 13 and the mounting plate 10, the dustsealing layer 42 extending across the bottom of the space 35 between the dust cover 36, body member end and collar 21 of the nipple-releasing means 20. In addition, another dustsealing layer 43 is located over the plate slot 12 on the side of the mounting plate 10 opposite to the body member 13. In particular, the dust sealing layer 43 is located between the mounting plate 10 and the bottom plate 15.

We claim as our invention:

1. In a coupling for use in a fluid circuit:
   (a) a mounting plate,
   (b) a body member mounted on the mounting plate,
   (c) a sleeve member movably mounted on and extending from one end of the body member,
   (d) a nipple-releasing means fixed to the mounting plate and embracing the sleeve member, the nipple-releasing means being spaced from the one end of the body member,
   (e) a compression spring disposed about the sleeve member in the space between the body member and nipple-releasing means for holding the body member relatively away from the nipple-releasing means, and permitting relative axial movement toward and away from each other,
   (f) a dust cover disposed about the sleeve member and spring, and in the space between the body member and nipple-releasing means for deterring entry of foreign material into the space, and
   (g) the same compression spring engaging the dust cover and retaining the dust cover in place against the body member.

2. In a coupling as defined in claim 1, in which:
   (h) the dust cover includes a wall located against the body member, the wall including an aperture through which the sleeve member extends, and
   (i) the spring includes one end engaging the dust cover wall and the other end engaging the nipple-releasing means for urging the dust cover wall against the body member for retaining the dust cover in place.

3. In a coupling as defined in claim 2, in which:
   (j) the dust cover includes an intergral peripheral flange extending outwardly from the wall against the body member, and extending over and across the space and into overlappingly close adjacency to the nipple-releasing means for permitting relative axial movement therebetween and yet deterring entry of foreign material therebetween.

4. In a coupling as defined in claim 1, in which:
   (h) the mounting plate includes an elongate slot,
   (i) the body member includes guide means slidably mounted in the elongate slot, the elongate slot extending into the space between the body member and nipple-releasing means below the dust cover, and
   (j) a dust sealing layer extending over the elongate slot for deterring entry of foreign material into the space through the slot, the dust sealing layer being disposed between the body member and the mounting plate.

5. In a coupling as defined in claim 4, in which:
   (k) the dust sealing layer extends across the space between the dust cover, body member and nipple-releasing means, and is also disposed over the elongate slot on the side of the mounting plate opposite to the body member.

* * * * *